United States Patent [19]

Poels

[11] 4,368,082
[45] Jan. 11, 1983

[54] PAINT STRIPPING METHOD

[75] Inventor: Philip Poels, Sudbury, England

[73] Assignee: Strippers Paint Removal Services Ltd., Suffolk, England

[21] Appl. No.: 251,560

[22] Filed: Apr. 6, 1981

Related U.S. Application Data

[63] Continuation-in-part of Ser. No. 131,317, Mar. 18, 1980, abandoned.

[30] Foreign Application Priority Data

May 17, 1979 [GB] United Kingdom ............... 7917140

[51] Int. Cl.³ .......................... B08B 3/08; C09D 9/00
[52] U.S. Cl. ......................................... 134/4; 134/38; 252/159; 252/160; 252/DIG. 8
[58] Field of Search ..................... 134/4, 38; 252/159, 252/160, DIG. 2, DIG. 3, DIG. 8

[56] References Cited

U.S. PATENT DOCUMENTS

| | | | |
|---|---|---|---|
| 2,447,052 | 8/1948 | Bond et al. | 252/DIG. 8 X |
| 3,355,385 | 11/1967 | Mackley | 252/DIG. 8 X |
| 3,615,825 | 10/1971 | Gansser | 252/DIG. 8 X |
| 4,285,827 | 8/1981 | Wyatt | 252/DIG. 8 X |

FOREIGN PATENT DOCUMENTS 2822126 11/1979 Fed. Rep. of Germany ... 252/DIG. 8

Primary Examiner—Marc L. Caroff
Attorney, Agent, or Firm—Edwin E. Greigg

[57] ABSTRACT

Paint is removed from a painted surface by applying to the surface a solution containing an alkali metal hydroxide and a polyacrylate thickening agent having a viscosity which decreases above a predetermined transition pH. The initial pH of the composition is adjusted to just above the transition pH by including a sufficient amount of the hydroxide in the composition so that the composition is readily spreadable. As the pH of the composition falls during use its viscosity increases; thereby becoming more firmly attached to the surface; permitting the composition to remain in contact with the surface for a sufficient time to destroy the adhesion of the paint to the surface.

The thickening agent is a cross-linked carboxylated copolymer of acrylic acid and methacrylate.

2 Claims, 1 Drawing Figure

GRAPH 1. VISCOSITY/pH CURVE FOR 1% SOLUTION VISCALEX HV30.

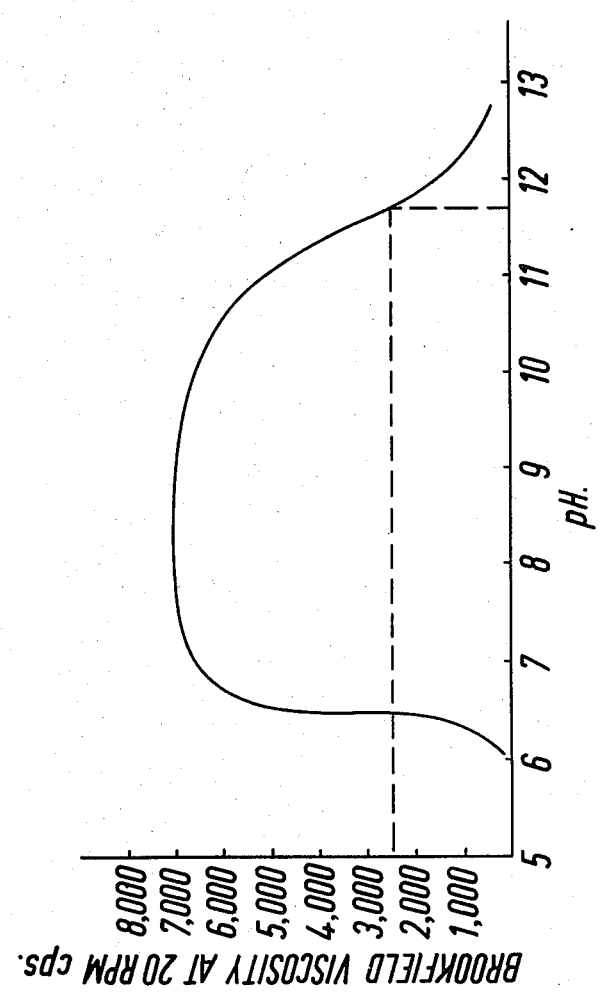

PAINT STRIPPING METHOD

CROSS-REFERENCE TO RELATED COPENDING APPLICATION

This application is a continuation-in-part application of my application Ser. No. 131,317 filed Mar. 18, 1980, now abandoned.

The present invention relates to a paint stripping composition and to a method of stripping paint from a surface; in particular it relates to a paint stripping composition for paints having free carboxyl groups which comprises a solution of an alkali metal hydroxide.

Aqueous solutions of alkali metal hydroxides, usually sodium hydroxide have long been used for stripping paint. However, such solutions can only be effectively used in stripping baths in which the article to be stripped is immersed. Such solutions are not suitable for in situ stripping since the hydroxide cannot be kept in contact with the surface to be stripped.

Aqueous alkali metal hydroxide solutions work by attacking the free carboxyl groups in the paint to be stripped, hydrolyzing the ester linkages and thus freeing further carboxyl groups for attack. Eventually the paint is rendered water permeable and may thus be washed off. However, when a stripping bath of such a hydroxide is used, full strength hydroxide in practice acts on the surface from which the paint has been removed and causes "bloom" on the article unless very thoroughly washed. Further, full strength hydroxide almost inevitably destroys the natural colour of wood, turning it an unattractive grey.

Furthermore, alkali metal hydroxide strippers are only effective on paints with free carboxyl groups, and hence are not effective, for example, against cellulose or epoxy paints. In consequence, most commercially available strippers now available are based on methylene chloride dispersed in one or more organic solvents. Methylene chloride strippers can remove paints of most types and hence these have been adopted since they are more ubiquitous in action. Methylene chloride acts by penetrating the outer layer of paint and effectively prying it from those beneath by partial evaporation. Unfortunately this action also has the effect of swelling the deeper layers of paint and hence preventing further stripping action by methylene chloride. Thus, each layer of paint must be scraped off individually; more stripper being applied to each successive coat.

Attempts have been made to improve the stripping action of methylene chloride by adding ever more complex solvents and stripping synergists resulting in ever harsher action on the article to be stripped. This harsher action has the disadvantage that it becomes increasingly difficult to effectively "kill" (i.e., neutralize the effects of) the action of such strippers after use, and hence, if new paint is applied to a so treated surface the new paint film can itself be attacked by residual stripper.

An attempt to improve strippers of this type was made in British Pat. No. 485857 which discloses the use of methylene chloride as a stripping agent along with an organic solvent, a filling agent such as talc, and a film forming agent in the form of a copolymer. The copolymer imparts thixotropic qualities to the mix and makes it particularly suitable for in situ application. Strippers of this type however have the disadvantage that they are noxious in use and inefficient in that only the uppermost of a number of layers of paint can be stripped on each application despite the addition of the film forming agent.

Attempts have also been made to substitute sodium hydroxide for methylene chloride in such mixtures but the results are quite unsatisfactory because the organic solvents used either react with the sodium hydroxide or prevent its dissociation.

The Applicants now seek to provide, therefore, a paint stripping composition which is thixotropic, needs no noxious organic solvent, and is easily removed by washing since its constituents are all soluble in water, and which can strip a larger number of coats of dried paint than heretofore by virtue of the progressive action of the dissociated hydroxide in the film forming agent, and thus reduce the necessity for repeated applications of the stripping composition.

According to the present invention, therefore, there is provided a stripping composition for paints having free carboxyl groups which comprises a solution of an alkali metal hydroxide characterized in that said solution is dispersed in a thixotropic polymeric film forming agent in the dissociated state.

In a further aspect of the present invention there is provided a method of manufacturing a stripping composition for paint having free carboxyl groups which comprises making up a dissociated solution of an alkali metal hydroxide, characterized by the gradual admixing of a thixotropic film forming agent to provide thixotropic dissociated gel of said agent and said alkali metal hydroxide and using the stripping composition to strip paint from a surface.

It has also been found that the application of a highly thixotropic paint stripping gel or paste to a surface to be stripped presents problems since it is in practice difficult to apply the stripper evenly. The Applicants have overcome this problem by utilizing a thixotropic polymeric film forming agent having a pH lower than that of the alkali metal hydroxide and wherein the thixotropic qualities of the agent fall above a predetermined transition pH as defined whereby the thixotropic qualities of the stripping composition increase as the pH of the composition falls in use.

In a particular embodiment of this type a cross-linked carboxylated acrylic copolymer having an acidic pH (eg: VISCALEX HV 30 Registered Trademark) is utilized as the film forming agent.

VISCALEX HV 30 is a tradename for a highly thixotropic polyacrylate thickening agent comprising an aqueous dispersion of 30% weight of cross-linked carboxylated copolymer of acrylic acid with methacrylate having an acid value of 78 in its final form, VISCALEX HV 30 has been fully described in a technical publication TPD/6004, title VISCALEX HV 30, by Allied Colloids Limited, P.O. Box 38, Low Moor Bradford, Yorkshire, England.

This has a transition pH; which is defined as the pH at which the Brookfield viscosity at 20 RPM cps falls to a value of $\frac{1}{3}$ of its maximum value, for example at about pH 11.75. At pH's below this level the viscosity and hence the thixotropic qualities rapidly increase. By adjusting the pH of the stripping composition to just above 11.75, a stripper which is still sufficiently thixotropic to be coated with facility is provided. Once the stripper is in situ it immediately begins to act upon the paint and its pH falls to below the transition pH thus increasing the viscosity and preventing any tendency for the applied film to migrate.

The solvent for alkali metal hydroxide, which is preferably potassium hydroxide or sodium hydroxide, is usually water, but may be a lower alcohol which allows of sufficient dissociation. Such alcohols may be selected for example from ethanol, isopropanol, or butanol.

The film forming agent may include a substantially inert extender such as talc, aluminum silicate, or chalk. In practice, chalk has been found to be the most advantageous.

The paint stripper should preferably contain at least 3% by weight of sodium hydroxide. It should preferably not contain more than 25% by weight of sodium hydroxide since it has been found that higher concentrations tend to damage some wood surfaces. For domestic use, however, a maximum concentration of 12% by weight of sodium hydroxide may be desirable; concentrations from 13 to 25% preferably being reserved for industrial use of the paint stripper.

In order to give the paint stripper a particularly satisfactory paste-like consistency it may contain from 15 to 80% by weight of fine chalk powder, from 85 to 20% by weight of water, and from 2 to 15% by weight of a film forming agent of the type described above such as a polyacrylate thickening agent comprising an aqueous dispersion of from 15 to 45% by weight of a cross-linked carboxylated copolymer of acrylic acid with methacrylate. The chalk powder should be fine and generally of a size such that 100% would pass through a 72 BSM sieve.

One embodiment of the invention will now be described with reference to the accompanying graph which shows the Brookfield viscosity of VISCALEX HV 30 against pH. As stated above the transition pH for VISCALEX HV 30 is about 11.75; a value shown in broken line form on the graph. This gives a viscosity of about 2300 cps which is sufficient when the VISCALEX is wholly dispersed within the aqueous sodium hydroxide to provide a readily spreadable mix. In a preferred form of this embodiment a stripping paste made of an aqueous solution of sodium hydroxide admixed with VISCALEX HV 30 and chalk, is formed. This paste is easily spreadable and becomes more firmly attached to the surface being stripped as the stripper starts to work and pH falls.

The following is an example by way of illustration only, of compositions in accordance with the invention and methods of producing the same.

EXAMPLE

Paint strippers suitable for the domestic market have the following compositions:

| Composition One | |
|---|---|
| SODIUM HYDROXIDE | 11.5% by weight |
| FINE CHALK POWDER | 38.5% by weight |
| VISCALEX HV 30 | 10% by weight |
| WATER | 40% by weight |
| Composition Two | |
| SODIUM HYDROXIDE | 5.5 parts by weight |
| FINE CHALK POWDER | 100 parts by weight |
| VISCALEX HV 30 | 2.7 parts by weight |
| WATER | 27 parts by weight |

Composition Three

As in composition two but wherein the fine chalk powder is replaced by aluminum silicate and additionally 2.3% isoprianol is added. In order to produce the compositions 1 to 3 the sodium hydroxide was gradually admixed with water, and VISCALEX HV 30 was added thereto in a mixer having a speed of 72 rpm. When these were thoroughly mixed the chalk or aluminum silicate were added, with the isoprianol when applicable. The speed of the paddle was held at a constant 72 rpm. Shearing action of the paddle was allowed to continue until the desired consistency was achieved.

It was found that such compositions act as good paint strippers and also the sodium hydroxide surprisingly had a cleaning effect on the wood surfaces being treated while being readily removable therefrom. After the composition had been applied to a painted wood surface the paint softens and subsequent washing with water leaves the surface paint-free and clean; ready for varnishing or polishing.

The paste-like composition has thixotropic properties which give a unique non-drip and non-splash quality not found in other paint stripping compositions due to the increase in viscosity and the falling pH as discussed above. In this connection it will be appreciated that in each of the foregoing compositions it is desirable to adjust the pH to just above 11.75. This may be effected either by adjusting slightly the relative amounts of VISCALEX and/or sodium hydroxide or where the pH is too high by the addition of compatible mineral acid.

Once the stripping composition has been formed the stripping composition may be applied to a painted surface for removal of the paint. It has been determined that as many as eight layers of paint may be removed with one application of the stripper composition depending on the thickness of each layer. The stripper composition is applied onto the painted surfaces and left until the paint layers are all softened by the stripper composition. The stripper composition and softened paint layers are then washed off by use of water which leaves the formerly painted surfaces paint-free and clean. The surface is now ready for varnishing or repainting. It is noted that this stripping composition works on all layers of paint, not just a single layer which requires application of the stripper composition to each layer of paint. This stripper composition removes all layers with one application.

I claim:

1. A method of stripping paint having free carboxyl groups from a previously painted surface at a single application, which comprises applying to said painted surface a composition comprising an alkali metal hydroxide, a solvent and a polyacrylate thickening agent comprising an aqueous dispersion of from 15 to 45% by weight of a cross-linked carboxylated copolymer of acrylic acid with methacrylate having a pH lower than that of said alkali metal hydroxide in which the viscosity of said agent falls above a predetermined transition pH, said hydroxide being present in said composition in an amount sufficient to adjust the pH of the composition to just above said transition pH, whereby the viscosity of the composition increases as the pH falls in use; and allowing the applied composition to remain in contact with said painted surface for sufficient time to destroy the adhesion of the paint to the painted surface and then rinsing the paint and composition from said substrate.

2. A method as claimed in claim 1 wherein the viscous polymeric thickening agent has a Brookfield viscosity at 20 rpm cps at a pH between 7 and 11 of over 3,000.

* * * * *